US009919494B2

(12) United States Patent
Franosch et al.

(10) Patent No.: US 9,919,494 B2
(45) Date of Patent: Mar. 20, 2018

(54) METALLIC PIPE HAVING A HYDROLYSIS-RESISTANT LAYER OF A POLYAMIDE MOULDING COMPOSITION

(71) Applicants: Juergen Franosch, Marl (DE); Franz-Erich Baumann, Dülmen (DE); Horst Beyer, Marl (DE); Andreas Dowe, Dinslaken (DE); Andreas Pawlik, Recklinghausen (DE)

(72) Inventors: Juergen Franosch, Marl (DE); Franz-Erich Baumann, Dülmen (DE); Horst Beyer, Marl (DE); Andreas Dowe, Dinslaken (DE); Andreas Pawlik, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 279 days.

(21) Appl. No.: 14/835,215

(22) Filed: Aug. 25, 2015

(65) Prior Publication Data
US 2016/0060459 A1    Mar. 3, 2016

(30) Foreign Application Priority Data
Aug. 26, 2014   (EP) ..................................... 14182218

(51) Int. Cl.
| | |
|---|---|
| *B32B 15/088* | (2006.01) |
| *C08L 77/02* | (2006.01) |
| *C08J 5/00* | (2006.01) |
| *C08G 73/02* | (2006.01) |
| *C08L 77/06* | (2006.01) |
| *B32B 15/08* | (2006.01) |
| *B32B 27/18* | (2006.01) |
| *B32B 27/28* | (2006.01) |
| *B32B 27/34* | (2006.01) |
| *B32B 1/08* | (2006.01) |
| *F16L 11/04* | (2006.01) |
| *F16L 9/147* | (2006.01) |
| *F16L 58/10* | (2006.01) |

(52) U.S. Cl.
CPC .............. *B32B 15/088* (2013.01); *B32B 1/08* (2013.01); *B32B 15/08* (2013.01); *B32B 27/18* (2013.01); *B32B 27/28* (2013.01); *B32B 27/34* (2013.01); *C08G 73/028* (2013.01); *C08J 5/00* (2013.01); *C08L 77/02* (2013.01); *C08L 77/06* (2013.01); *B32B 2270/00* (2013.01); *B32B 2307/306* (2013.01); *B32B 2307/714* (2013.01); *B32B 2597/00* (2013.01); *B32B 2605/08* (2013.01); *C08J 2377/02* (2013.01); *C08J 2477/02* (2013.01); *F16L 9/147* (2013.01); *F16L 11/04* (2013.01); *F16L 58/10* (2013.01)

(58) Field of Classification Search
None
See application file for complete search history.

(56) References Cited

U.S. PATENT DOCUMENTS

| | | | | |
|---|---|---|---|---|
| 5,554,426 | A * | 9/1996 | Rober | ..................... B32B 27/08 138/118 |
| 5,850,855 | A | 12/1998 | Kerschbaumer et al. | |
| 6,085,799 | A | 7/2000 | Kodaissi et al. | |
| 6,123,114 | A | 9/2000 | Seguin et al. | |
| 6,677,015 | B2 | 1/2004 | Himmelmann et al. | |
| 7,005,481 | B1 | 2/2006 | Lehmann et al. | |
| 8,580,899 | B2 | 11/2013 | Dowe et al. | |
| 8,647,551 | B2 | 2/2014 | Dowe et al. | |
| 2002/0019477 | A1 | 2/2002 | Bartz et al. | |
| 2002/0082352 | A1 | 6/2002 | Schmitz et al. | |
| 2002/0142118 | A1 * | 10/2002 | Schmitz | .................... B32B 1/02 428/35.7 |

(Continued)

FOREIGN PATENT DOCUMENTS

| | | |
|---|---|---|
| EP | 1 170 334 A2 | 1/2002 |
| EP | 1 170 334 A3 | 1/2002 |

(Continued)

OTHER PUBLICATIONS

Extended European Search Report dated May 25, 2016 in Patent Application No. 15181946.3 (with English Translation of Categories of Cited Documents).
Buccella M. et al., "Thermo-mechanical Properties of Polyamide 6 Chemically Modified by Chain Extension with Polyamide/Polycarbonate Blend", Journal of Polymer Research, vol. 19, No. 8, XP035096796, Jul. 18, 2012, 9 pages.
Dai Lixing et al., "PA6 Obtained by Polymerization with Trifunctional Regulators and its DSC Results", Journal of Dong Hua University (English Edition)Dec. 2000 editorial Board of Journal of Dong Hua University Cn, vol. 17, No. 4, XP009189927, Dec. 1, 2000.

(Continued)

*Primary Examiner* — Marc S Zimmer
(74) *Attorney, Agent, or Firm* — Oblon, McClelland, Maier & Neustadt, L.L.P.

(57) ABSTRACT

A metallic pipe for contact with a hydrolyzing medium provides longer operating times and improved high temperature resistance. The pipe contains a layer of a polyamide moulding composition containing at least 50% by weight of polyamide content containing: I) 60 to 98 parts by weight of a polyamide which contains 10 to 70 meq/kg of a terminal carboxy group and has a relative solution viscosity $\eta_{rel}$ of at least 1.90, and II) 2 to 40 parts by weight of a polyamine-polyamide graft copolymer produced from: a) 0.5 to 25% by weight, based on the entire monomer mixture, of a polyamine having at least 4 nitrogen atoms, and b) 75 to 99.5% by weight, based on the entire monomer mixture, of polyamide-forming monomers selected from lactams, ω-aminocarboxylic acids and/or equimolar combinations of diamine and dicarboxylic acid, with the proviso that the amino group concentration of the graft copolymer is in the range from 100 to 2500 meq/kg, wherein the sum of the parts by weight of I) and II) is 100.

19 Claims, 3 Drawing Sheets

(56) References Cited

U.S. PATENT DOCUMENTS

| | | |
|---|---|---|
| 2004/0265527 A1 | 12/2004 | Schmitz et al. |
| 2005/0038201 A1 | 2/2005 | Wursche et al. |
| 2006/0141188 A1 | 6/2006 | Schmitz et al. |
| 2006/0182916 A1 | 8/2006 | Dowe et al. |
| 2006/0183869 A1 | 8/2006 | Dowe et al. |
| 2008/0317986 A1* | 12/2008 | Schmitz ............. B32B 1/08 428/35.7 |
| 2010/0009106 A1 | 1/2010 | Dowe et al. |
| 2010/0257932 A1 | 10/2010 | Braman et al. |
| 2010/0300572 A1 | 12/2010 | Dowe et al. |
| 2010/0300573 A1* | 12/2010 | Dowe ............. B29C 63/34 138/145 |
| 2011/0165358 A1 | 7/2011 | Dowe et al. |
| 2011/0209768 A1 | 9/2011 | Dowe et al. |
| 2012/0000541 A1 | 1/2012 | Dowe et al. |
| 2013/0092233 A1* | 4/2013 | Pawlik ............. B32B 27/08 136/259 |
| 2013/0171388 A1 | 7/2013 | Pawlik et al. |
| 2013/0287981 A1 | 10/2013 | Berger et al. |

FOREIGN PATENT DOCUMENTS

| | | |
|---|---|---|
| EP | 1 216 823 A2 | 6/2002 |
| EP | 1 216 823 A3 | 6/2002 |
| EP | 1 216 826 A2 | 6/2002 |
| EP | 1 216 826 A3 | 6/2002 |
| EP | 2 581 947 A1 | 4/2013 |
| EP | 2 610 279 A1 | 7/2013 |
| EP | 2 660 295 A1 | 11/2013 |
| WO | WO 01/61232 A1 | 8/2001 |
| WO | WO 2006/040206 A1 | 4/2006 |

OTHER PUBLICATIONS

Katsuaki Kuze et al., "Synthesis of Polyamide Having Aromatic Ring in Main Chain, III. The Formation of Imino Linkage in the Preparation of Polyamide", Kobunshi Kagaku, The Society of Polymer Science, Japan, vol. 25, No. 277, XP002757428, 1968, pp. 318-324 (with English Abstract and English Translation).

European Search Report dated Nov. 27, 2014 in Patent Application No. 14182218.9 (with English translation of categories of cited documents).

* cited by examiner

METALLIC PIPE HAVING A HYDROLYSIS-RESISTANT LAYER OF A POLYAMIDE MOULDING COMPOSITION

BACKGROUND OF THE INVENTION

Field of the Invention

The invention relates to a metallic pipe comprising a hydrolysis-resistant layer of a polyamide moulding composition, to the use of this type of pipe for conveying a hydrolyzing medium, to a hydrolysis-resistant polyamide moulding composition suitable for contact with a hydrolyzing medium, and to mouldings made therefrom.

Discussion of the Background

The property profile of polyamides, and in particular of polyamides with a low concentration of carbonamide groups, for example PA11 and PA12, has led to use of these in a wide variety of technical application sectors. Among these, mention may be made inter alia of lines for the transport of coolants in the automobile industry, and also inliners in the field of offshore oil production, which in particular require good hydrolysis resistance. However, applications of this type increasingly demand materials with even higher hydrolysis resistance, in particular at higher temperatures.

U.S. Pat. No. 5,850,855 discloses, for automobiles, a coolant-liquid line in which the external layer is composed of a polyamide with an excess of terminal amino groups. The intention there is to improve hydrolysis resistance. However, pipes of this type produced by coextrusion use a moulding composition with a high melt viscosity, and this means that because of the high molecular weight associated therewith the polyamide has a low concentration of terminal groups. When an excess of terminal amino groups is present here, it is insufficiently effective simply in terms of quantity. This solution is moreover restricted to pipes with small diameter, of the type typical in automobile applications.

When pipes, profiles and other hollow bodies are extruded, in particular in geometries having large dimensions, various problems can arise after discharge of the melt from the die, these being caused inter alia by gravitational force. A visual sign of low melt viscosity here is that the melt tube sags as it is discharged. Gravity causes wall thickness changes, and the hollow body can therefore have irregular wall thickness distribution. There are moreover severe restrictions on the sizes achievable for particular geometries and on the geometries achievable in profile extrusion. The melt stiffness of conventional polyamides is not adequate here to permit production of the preferred geometries in a manner that is technically and economically satisfactory and that provides dimensional accuracy and reliability. Low melt stiffness moreover leads to an uneven, unstable extrusion process, a result of which can be uneven progress of the melt strand into the calibration unit. This can lead to production problems. If, in contrast, the melt tube has high melt stiffness after it leaves the die, its progress is markedly more stable and it becomes less susceptible to external extrusion effects. In the case of vertical extrusion (e.g. parison) it is necessary to prevent break-off of the extruded melt tube, and also to prevent any increase in length, since this would reduce wall thickness. The dimensions of the geometries that this extrusion technology can produce are currently limited by the melt stiffness of the polyamide moulding composition used. Specifically, there is a requirement here for high melt stiffness in order to permit extrusion of large dimensions.

However, high viscosity makes it difficult to extrude a polyamide moulding composition with high melt stiffness. This requires build-up of an exceptionally high pressure in the machine; even if this is achieved it remains impossible to produce geometries with large dimensions at extrusion rates that are economically viable, since even at relatively small throughputs the motor is subjected to high load.

U.S. Pat. No. 8,647,551 and U.S. Pat. No. 8,580,899 provide a solution to this problem. Those specifications describe a process for the production of mouldings with condensation of a polyamide moulding composition to increase molecular weight, with a compound having at least two carbonate units, where a premix of the polyamide moulding composition and the compound having at least two carbonate units is produced and the premix is then processed to give the moulding, and it is in this step that the melting of the premix and the condensation to increase molecular weight first take place. US 2011/0165358 moreover discloses that a compound having at least two carbonate units can be used in a masterbatch which moreover comprises a polyetheramide, at least 50% of the terminal groups of which are amino groups. This process has the disadvantage that terminal amino groups are consumed in the reaction of the compound having at least two carbonate units with the polyamide. These are then no longer available for hydrolysis resistance.

U.S. Pat. No. 6,677,015 describes a moulding composition with good capability for blow-moulding; it is composed of at least 50% by weight of a polyamide produced with use of from 0.05 to 2.5% by weight of a polyamine as branching agent. This moulding composition exhibits a high level of pseudoplasticity; however that specification describes only the production of relatively small-volume mouldings.

Moulding compositions similar to those of U.S. Pat. No. 6,677,015 can, according to US 2010/0009106, US 2010/0300573, US 2011/0209768 and US 2011/0165358, be processed together with a compound having at least two carbonate units to give large pipes which are used as inliners for pipelines, for example supply lines, drainage lines or oil-conveying lines. The polyamide moulding compositions used there can comprise a polyamine as branching agent; however, no moulding compositions of that type are available commercially.

Hydrolysis-resistant mouldings made of a polyamide moulding composition are known from US 2013/0171388. That document says that a premix of a polyamide moulding composition and from 0.1 to 5% by weight of an oligo- or polycarbodiimide is processed to give a moulding, and condensation to increase molecular weight, i.e. an increase in the molecular weight of the polyamide, takes place in the processing step here. It is thus possible to produce mouldings having markedly improved hydrolysis resistance, with geometries having large dimensions.

For many applications, however, the hydrolysis resistance achievable according to the background art in polyamide moulding compositions is not sufficient. In particular in the case of oil-conveying lines, the lifetime of the inliners present therein is a decisive factor for cost-effectiveness. This is particularly the case for the flexible offshore lines that are very expensive because of their complicated structure. When the inliner fails it cannot readily be replaced. The requirement that has to be met is therefore that the operating time of the inliner at least equals the intended service time of the line.

SUMMARY OF THE INVENTION

One aspect of the object of the present invention consisted in providing a polyamide moulding composition and mouldings with significantly improved hydrolysis resistance. This improved hydrolysis resistance should be retained to a very substantial extent even after reaction of a portion of the terminal amino groups with a chain extender during the production of mouldings with large geometries, thus permitting longer operating times and improved resistance to high temperatures. It should moreover be possible, by simple modification of the composition, to adapt the moulding composition so that it is appropriate for the requirements of particular applications.

Another aspect of the object of the present invention consisted in providing a metallic pipe having a layer of a hydrolysis-resistant polyamide moulding composition having an increased lifetime in contact with a hydrolyzing medium.

This and other objects of the present invention have been achieved by the present invention which in one embodiment relates to a metallic pipe, comprising:

a layer of a polyamide moulding composition comprising at least 50% by weight of polyamide content comprising the following components:
- I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
- II) from 2 to 40 parts by weight of a polyamine-polyamide graft copolymer which is produced from the following monomers:
  - a) from 0.5 to 25% by weight, based on the entire monomer mixture, of a polyamine having at least 4 nitrogen atoms, and
  - b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof, with the proviso that the amino group concentration of the graft copolymer is in the range from 100 to 2500 meq/kg, wherein the sum of the parts by weight of I) and II) is 100.

In another embodiment, the present invention relates to a method for conveying a hydrolyzing medium, comprising:
conveying said hydrolyzing medium through a metallic pipe as above.

The present invention also relates to a polyamide mixture, comprising:
at least 50% by weight of polyamide content comprising the following components:
- I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
- II) from 2 to 40 parts by weight of a polyamine-polyamide graft copolymer which is produced from the following monomers:
  - a) from 0.5 to 25% by weight, based on the entire monomer mixture, of a polyamine having at least 4 nitrogen atoms, and
  - b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof, with the proviso that the amino group concentration of the graft copolymer is in the range from 100 to 2500 meq/kg, wherein the sum of the parts by weight of I) and II) is 100 and wherein the polyamide mixture further comprises from 0.005 to 10% by weight, calculated as a ratio to the polyamide content used, of a compound having at least two carbonate units.

The present invention further relates to a polyamide mixture, comprising:
at least 50% by weight of polyamide content comprising the following components:
- I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
- II) from 2 to 40 parts by weight of a polyamine-polyamide graft copolymer which is produced from the following monomers:
  - a) from 0.5 to 25% by weight, based on the entire monomer mixture, of a polyamine having at least 4 nitrogen atoms, and
  - b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof, with the proviso that the amino group concentration of the graft copolymer is in the range from 100 to 2500 meq/kg, wherein the sum of the parts by weight of I) and II) is 100 and wherein the polyamide of component I is produced using from 0.01 to 0.6 mol %, based on the entirety of the polymers used, of an at least trifunctional chain regulator having a functional group which is a carboxyl group and/or an amino group or the respective derivatives thereof.

In another embodiment, the present invention relates to a moulding, comprising:
at least a region comprising the above polyamide mixture.

DETAILED DESCRIPTION OF THE INVENTION

Figure 1:
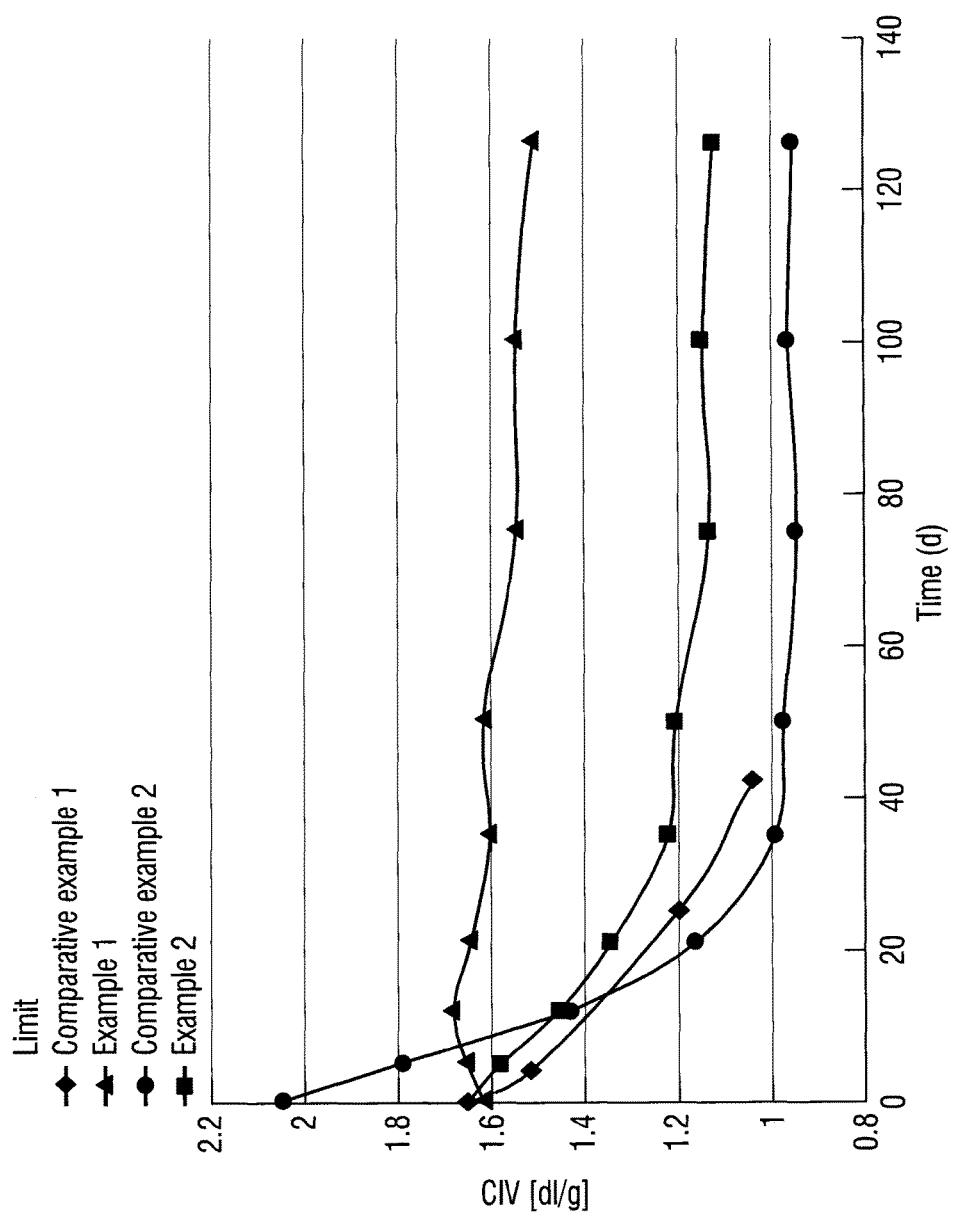
FIG. 1 show the time dependence of the corrected inherent viscosity CIV of extracted specimens.

All ranges provided herein below include all values and subvalues between the lower and upper limits of the range.

The present invention provides a metallic pipe comprising a layer of a moulding composition comprising at least 50% by weight, preferably at least 60% by weight, particularly preferably at least 70% by weight, with particular preference at least 80% by weight and very particularly preferably at least 90% by weight, in each case based on the polyamide mixture, of polyamide content composed of the following components:

I) from 60 to 98 parts by weight, preferably from 65 to 97 parts by weight, particularly preferably from 70 to 96 parts by weight and very particularly preferably from 75 to 95 parts by weight, of a polyamide which comprises from 10 to 70 meq/kg, preferably from 14 to 60 meq/kg, particularly preferably from 18 to 55 meq/kg and with particular preference from 22 to 50 meq/kg, of terminal carboxy groups and has a relative solution viscosity $\eta_{rel}$ of at least 1.90, preferably of at least 1.95, particularly preferably of at least 2.00 and with particular preference at least 2.05, determined in accordance 307 using a 0.5% by weight solution in m-cresol at 25° C., and II) from 2 to 40 parts by weight, preferably from 3 to 35 parts by weight, particularly preferably from 4 to 30 parts by weight and very particularly preferably from 5 to 25 parts by weight, of a polyamine-polyamide graft copolymer which is produced from the following monomers:

a) from 0.5 to 25% by weight, preferably from 1 to 20% by weight, and particularly preferably from 1.5 to 16% by weight, based on the entire monomer mixture, of a polyamine having at least 4, preferably at least 6, particularly preferably at least 8 and with particular preference at least 11, nitrogen atoms, and b) from 75 to 99.5% by weight, preferably from 80 to 99% by weight and particularly preferably from 84 to 98.5% by weight, based on the entire monomer mixture, of polyamide-forming monomers selected from lactams, ω-aminocarboxylic acids and/or equimolar combinations of diamine and dicarboxylic acid, with the proviso that the amino group concentration of the graft copolymer is in the range from 100 to 2500 meq/kg, preferably in the range from 200 to 2000 meq/kg and particularly preferably in the range from 300 to 1600 meq/kg, where the sum of the parts by weight of I) and II) is 100.

The invention also provides the use of this type of metallic pipe for conveying a hydrolyzing medium. A hydrolyzing medium is in particular water, coolant liquid, crude oil (which always comprises water deriving from deposit conditions or from processes), natural gas or humid air, in particular at higher temperatures, for example above 60° C., above 80° C. or above 90° C.

In a preferred embodiment, the polyamide of component I is produced using from 0.01 to 0.6 mol %, based on the entirety of the monomers used, of an at least trifunctional chain regulator having functional groups which are carboxyl groups and/or amino groups or the respective derivatives thereof. Derivatives mean those which are either converted to carboxyl groups or amino groups as intermediates during the polycondensation or react analogously to these, examples being ester groups, acid chloride groups, amide groups or urethane groups. Such polyamide moulding compositions are particularly hydrolysis-resistant. Polyamide moulding compositions of this kind, either in the form of a moulding composition or of the precursor thereof, namely of a dry mix of components I and II, are likewise provided by the present invention.

The invention further provides a moulding which comprises a region made of the polyamide mixture of the invention, where the polyamide mixture here takes the form of moulding composition. These mouldings are preferably hollow bodies or films. Examples of films are backsheet films in solar modules which are susceptible to hydrolytic damage by warm humid air. The term hollow bodies in the invention means not only containers but also hollow profiles, in particular pipes.

The polyamide of component I of the polyamide mixture, and, respectively, of the layer of a polyamide moulding composition, can be produced from a combination of diamine and dicarboxylic acid, or from an ω-aminocarboxylic acid or the corresponding lactam. In principle it is possible to use any polyamide, for example PA6, PA66 or copolyamides on this basis having units which derive from terephthalic acid and/or from isophthalic acid (generally termed PPA), PA9T and PA10T and blends of these with other polyamides. In one preferred embodiment, the monomer units of the polyamide comprise on average at least 8, at least 9, or at least 10, C atoms. In the case of mixtures of lactams it is the arithmetic average that is considered here. In the case of a combination of diamine and dicarboxylic acid, the arithmetic average of the number of C atoms of diamine and dicarboxylic acid in this preferred embodiment must be at least 8, at least 9 or at least 10. Examples of suitable polyamides are: PA610 (which can be produced from hexamethylenediamine [6 C atoms] and sebacic acid [10 C atoms], the average of the number of C atoms in the monomer units here thus being 8), PA88 (which can be produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212, PA1213 and PA12. The production of the polyamides is background art. It is, of course, also possible to use copolyamides based on these materials, and it is also optionally possible here to make concomitant use of monomers such as caprolactam. It is particularly preferable to use PA11 or PA12.

The polyamide can also be a polyetheramide. Polyetheramides are in principle known by way of example from DE A 30 06 961. They comprise a polyetherdiamine as comonomer. Suitable polyetherdiamines are accessible through conversion of the corresponding polyetherdiols by reductive amination or coupling to acrylonitrile with subsequent hydrogenation (e.g. EP A-0 434 244; EP-A-0 296 852). The polyether unit in the polyetherdiamine can by way of example be based on 1,2-ethanediol, 1,2-propanediol, 1,3-propanediol, 1,4-butanediol or 1,3-butanediol. The polyether unit can also have mixed structure, for example with random or blockwise distribution of the units deriving from the diols. The weight-average molar mass of the polyetherdiamines is from 200 to 5000 g/mol and preferably from 400 to 3000 g/mol; the proportion of these in the polyetheramide is preferably from 4 to 60% by weight and particularly preferably from 10 to 50% by weight. Suitable polyetherdiamines are obtainable commercially by way of example in the form of the JEFFAMINE®D or ED grades or the ELASTAMINE® grades from Huntsman Corp. or in the form of the polyetheramine D series from BASF SE. If the intention is to use a branched polyetheramide, it is also possible to make concomitant use of small quantities of a polyethertriamine, e.g. a JEFFAMINE® T grade. It is preferable to use polyetherdiamines which comprise, for each ether oxygen, on average at least 2.3 carbon atoms in the chain.

It is also equally possible to use mixtures of various polyamides, as long as compatibility is adequate. Compatible polyamide combinations are known to the person skilled in the art; mention may be made here by way of example of the combinations PA12/PA1012, PA12/PA1212, PA612/PA12, PA613/PA12, PA1014/PA12 and PA610/PA12, and also corresponding combinations with PA11. In case of doubt, compatible combinations can be determined through routine experimentation.

One preferred embodiment uses a mixture from 30 to 99% by weight, preferably from 40 to 98% by weight and particularly preferably from 50 to 96% by weight, of polyamide in the narrower sense and from 1 to 70% by weight preferably from 2 to 60% by weight and particularly preferably from 4 to 50% by weight, of polyetheramide.

In the production of this polyamide it is possible to establish the desired concentration of terminal carboxy groups according to the background art with the aid of a chain regulator. Examples of suitable chain regulators are monoamines, monocarboxylic acids, diamines, dicarboxylic acids, triamines, tricarboxylic acids, tetraamines, tetracarboxylic acids and, respectively, oligoamines or oligocarboxylic acids having in each case from 5 to 8 amino or carboxy groups. Preference is given here to the use of dicarboxylic acids, tricarboxylic acids or a mixture of dicarboxylic acids and tricarboxylic acids. By way of example it is possible to use dodecanedicarboxylic acid as dicarboxylic acid and trimellitic acid as tricarboxylic acid. The quantity of the chain regulator added is that required to obtain the inventive combination of $\eta_{rel}$ and terminal carboxy group content. The use of a tricarboxylic acid or of a triamine increases not only the molecular weight but also the concentration of terminal groups, since these act as branching agent. The same is true of tetraamines, tetracarboxylic acids, oligoamines and oligocarboxylic acids. If a triamine, a tetraamine or an oligoamine is used as branching agent, the desired concentration of terminal carboxy groups can be established by using a dicarboxylic acid simultaneously for chain transfer.

Suitable usage quantities for tricarboxylic acid, triamine, tetraamine, tetracarboxylic acid, oligoamine and, respectively, oligocarboxylic acid are from 0.01 to 0.6 mol %, preferably from 0.1 to 0.5 mol % and particularly preferably from 0.15 to 0.4 mol %, based in each case on the entirety of the monomers used.

A preferred polyamide of component I has a relative solution viscosity $\eta_{rel}$ in the range from 2.0 to 2.2 and a terminal carboxy group content in the range from 30 to 60 meq/kg. Here, it is moreover preferred that, at the same time, the concentration of the terminal carboxy groups is higher than the concentration of the terminal amino groups. Surprisingly, a considerably improved hydrolysis resistance of the moulding composition or of the mouldings is found in this situation. This was unexpected in the light of the background art, which teaches that hydrolysis resistance is increased by increasing the concentration of the terminal amino groups.

Terminal carboxy groups are determined by dissolving 1 g of polyamide in 50 ml of benzyl alcohol under nitrogen blanketing at 165° C. The solution is titrated with a solution of KOH in ethylene glycol (0.05 mol of KOH/l) with phenolphthalein as indicator until colour change occurs.

The relative solution viscosity $\eta_{rel}$ of the polyamide of component I must be sufficiently high. This ensures that the terminal carboxy group content of the polyamide is within the range according to the claims, while at the same time avoiding inappropriately high content of terminal amino groups. As is known, higher $\eta_{rel}$ implies lower total terminal group content. It is moreover advantageous that a certain molecular weight reserve is present, in order to permit toleration of a certain level of hydrolysis.

An upper limit of the relative solution viscosity $\eta_{rel}$ is in the first instance set via the requirement that the polyamide remains processable. This longer entirely ensured if $\eta_{rel}$ is extremely high. $\eta_{rel}$ is generally at most 3.0, preferably at most 2.8 and particularly preferably at most 2.6. The upper limit of $\eta_{rel}$ is also set via the requirement that the polyamide possesses at least 10 meq/kg of terminal carboxy groups.

The polyamine-polyamide graft copolymer can by way of example use the following classes of substance as polyamine:

polyvinylamines (Römpp Chemie Lexikon [Römpp's Chemical Dictionary], 9th Edition, Volume 6, page 4921, Georg Thieme Verlag Stuttgart 1992);

polyamines produced from alternating polyketones (DE-A 196 54 058);

dendrimers, for example
$((H_2N—(CH_2)_3)_2N—(CH_2)_3)_2—N(CH_2)_2—N((CH_2)_2—N((CH_2)_3—NH_2)_2)_2$
(DE-A-196 54 179) or tris(2-aminoethyl)amine, N,N-bis(2-aminoethyl)-N',N-bis[2-[bis(2-aminoethyl)amino]ethyl]-1,2-ethanediamine, 3,15-bis(2-aminoethyl)-6,12-bis[2-[bis(2-aminoethyl) amino]ethyl]-9-[2-[bis[2-bis(2-aminoethyl)amino]ethyl] amino]ethyl]-3,6,9,12,15-pentaazaheptadecane-1,17-diamine (J. M. Warakomski, Chem. Mat. 1992, 4, 1000-1004);

linear polyethyleneimines which can be produced by polymerization of 4,5-dihydro-1,3-oxazoles followed by hydrolysis (Houben-Weyl, Methoden der Organischen Chemie [Methods of Organic Chemistry]), Vol. E20, pp. 1482-1487, Georg Thieme Verlag Stuttgart, 1987);

branched polyethyleneimines obtainable by polymerization of aziridines (Houben-Weyl, Methoden der Organischen Chemie), Vol. E20, pp. 1482-1487, Georg Thieme Verlag Stuttgart, 1987) and generally having the following amino group distribution:

from 25 to 46% of primary amino groups,
from 30 to 45% of secondary amino groups, and
from 16 to 40% of tertiary amino groups.

In the preferred case the number-average molar mass $M_n$ of the polyamine is at most 20 000 g/mol, particularly preferably at most 10 000 g/mol and with particular preference at most 5000 g/mol.

Lactams and ω-aminocarboxylic acids which can be used as polyamide-forming monomers comprise from 4 to 19 carbon atoms, in particular from 6 to 12. Particular preference is given to use of ε-caprolactam, ε-aminocaproic acid, caprylolactam, ω-aminocaprylic acid, laurolactam, ω-aminododecanoic acid and/or ω-aminoundecanoic acid.

Examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. However it is possible to use not only these but also any other combination, for example decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam.

The production of these graft copolymers is described in more detail in U.S. Pat. No. 6,355,358.

Amino groups of the polyamine-polyamide graft copolymer here and hereinafter are not only terminal amino groups but also optionally present secondary and tertiary amine functions of the polyamine. The amino groups are determined by dissolving 1 g of the graft copolymer in 50 ml of m-cresol at 25° C. The solution is titrated potentiometrically with perchloric acid. The terminal amino group concentration of the polyamide of component I is also determined in this way.

The terminal carboxy group content of the polyamine-polyamide graft copolymer should be as low as possible. It is preferably at most 15% of the amino group content, particularly preferably at most 10% of the amino group content, with particular preference at most 8% of the amino group content and very particularly preferably at most 5% of the amino group content. In another preferred embodiment it is at most 10 meq/kg and particularly preferably at most 6 meq/kg.

For the combination of components I and II of the polyamide mixture, care must be taken that the two components in the melt mixture have adequate compatibility with one another. Compatibility can be assessed particularly easily by using DSC in accordance with DIN EN ISO 11357-3; it is discernible in that the crystallite melting points $T_m$ of the individual components in the moulding composition have been shifted towards one another or become fully identical. It is preferable that in the moulding composition the separation of the crystallite melting points I and II is reduced by at least 30% and particularly by at least 50%, or very particularly become identical.

Compatibility I and II can be controlled by way of the respective composition. Particular preference is given here to the following embodiments:

If the monomer units of the polyamide of component I have on average from 6 to 7.5 C atoms, the polyamide content of the graft copolymer of component II has on average from 6 to 9 C atoms preferably from 6 to 8 C atoms and particularly preferably from 6 to 7.5 C atoms.

If the monomer units of the polyamide of component I have on average from 7.5 to 9 C atoms, the polyamide content of the graft copolymer of component II has on average from 6 to 10.5 C atoms preferably from 7 to 9.5 C atoms and particularly preferably from 7.5 to 9 C atoms.

If the monomer units of the polyamide of component I have on average from 9 to 10.5 C atoms, the polyamide content of the graft copolymer of component II has on average from 7.5 to 12 C atoms preferably from 8.5 to 11 C atoms and particularly preferably from 9 to 10.5 C atoms.

If the monomer units of the polyamide of component I have on average from 10.5 to 12 C atoms, the polyamide content of the graft copolymer of component II has on average from 9 to 13.5 C atoms preferably from 10 to 12.5 C atoms and particularly preferably from 10.5 to 12 C atoms.

The procedure here when component I is composed of a number of different polyamides is that the average of the number of C atoms of this polyamide mixture is calculated as though this polyamide mixture were a copolyamide. If one of these polyamides is a polyetheramide, only the polyamide content thereof is taken into account, the polyether blocks being ignored.

It is generally particularly preferable that the average values of the number of C atoms of components I and II differ at most by 1 and in particular by at most 0.5; it is very particularly preferable that they are identical. With particular preference the polyamide of component I and the polyamide content of component II have identical monomer composition.

In all these cases the polyamide content of component II is the content resulting from component II b).

The polyamide mixture of the invention can comprise, alongside components I and II, other constituents such as impact modifiers, other thermoplastics, plasticizers and other conventional additional substances.

Examples of suitable impact modifiers are ethylene/α-olefin copolymers, preferably selected from a) ethylene/$C_3$-$C_{12}$-α-olefin copolymers having from 20 to 96% by weight, preferably from 25 to 85% by weight, of ethylene. $C_3$-$C_{12}$-α-olefin used is by way of example propene, 1-butene, 1-pentene, 1-hexene, 1-octene, 1-decene or 1-dodecene. Typical examples of these materials are ethylene-propylene rubber, and also LLDPE and VLDPE.

b) Ethylene/$C_3$-$C_{12}$-α-olefin/unconjugated diene terpolymers having from 20 to 96% by weight, preferably from 25 to 85% by weight of ethylene and up to at most about 10% by weight of an unconjugated diene such as bicyclo(2.2.1)heptadiene, 1,4-hexadiene, dicyclopentadiene or 5-ethylidenenorbornene. Examples of a suitable $C_3$-$C_{12}$-α-olefin are likewise propene, 1-butene, 1-pentene, 1-hexene, 1-octene, 1-decene or 1-dodecene.

The production of these copolymers or terpolymers, for example with the aid of a Ziegler-Natta catalyst, is background art.

Other suitable impact modifiers are styrene-ethylene/butylene block copolymers. Here it is preferable to use styrene-ethylene/butylene-styrene block copolymers (SEBS), these being obtainable through hydrogenation of styrene-butadiene-styrene block copolymers. However, it is also possible to use diblock systems (SEB) or multiblock systems. Block copolymers of this type are background art.

These impact modifiers preferably comprise anhydride groups introduced in a known manner through thermal or free-radical reaction of the main-chain polymer with an unsaturated dicarboxylic anhydride, an unsaturated dicarboxylic acid or an unsaturated monoalkyl dicarboxylate, in a concentration that is sufficient for good linkage to the polyamide. Examples of suitable reagents are maleic acid, maleic anhydride, monobutyl maleate, fumaric acid, citraconic anhydride, aconitic acid or itaconic anhydride. It is preferable that from 0.1 to 4% by weight of an unsaturated anhydride are grafted onto the impact modifier in this way. According to the background art it is also possible that when the unsaturated dicarboxylic anhydride or precursor thereof is grafted onto the material the former is accompanied by another unsaturated monomer, for example styrene, α-methylstyrene or indene.

Other suitable impact modifiers are copolymers which comprise units of the following monomers:

a) from 20 to 94.5% by weight of one or more α-olefins having from 2 to 12 C atoms, b) from 5 to 79.5% by weight of one or more acrylic compounds selected from acrylic acid and methacrylic acid and salts thereof, esters of acrylic acid and methacrylic acid with a C1-C12-alcohol, where these can optionally bear a free hydroxy or epoxy function, acrylonitrile and methacrylonitrile, acrylamides and methacrylamides, c) from 0.5 to 50% by weight of an olefinically unsaturated epoxide, carboxylic anhydride, carboximide, oxazoline or oxazinone.

This copolymer is by way of example composed of the following monomers, where this list is not exhaustive:
a) α-olefins such as ethylene, propene, 1-butene, 1-pentene, 1-hexene, 1-octene, 1-decene and 1-dodecene;
b) acrylic acid, methacrylic acid and salts thereof, for example with $Na^{\oplus}$ or $Zn^{2\oplus}$ as counterion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxylethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;
c) vinyloxirane, allyloxirane, glycidyl acrylate, glycidyl methacrylate, maleic anhydride, aconitic anhydride, itaconic anhydride, and also the dicarboxylic acids produced from these anhydrides by reaction with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone and isopropenyloxazinone.

When glycidyl acrylate or glycidyl methacrylate are used these also function simultaneously as acrylic compound b), and therefore if the quantity of glycidyl(meth)acrylate is adequate there is no need for the presence of any other acrylic compound. In this specific embodiment the copolymer comprises units of the following monomers:
a) from 20 to 94.5% by weight of one or more α-olefins having from 2 to 12 C atoms,
b) from 0 to 79.5% by weight of one or more acrylic compounds selected from
acrylic acid and methacrylic acid and salts thereof,
esters of acrylic acid and methacrylic acid with a $C_1$-$C_{12}$-alcohol,
acrylonitrile and methacrylonitrile,
acrylamides and methacrylamides
c) from 0.5 to 80% by weight of an ester of acrylic acid or methacrylic acid, where said ester comprises an epoxy group,
where b) and c) give a total of at least 5.5% by weight.

The copolymer can comprise a small quantity of other copolymerized monomers as long as these do not significantly impair properties, an example being dimethyl maleate, dibutyl fumarate, diethyl itaconate or styrene.

The production of copolymers of this type is background art. A wide variety of various types of these is obtainable commercially, for example as LOTADER® (Arkema; ethylene/acrylate/tercomponent or ethylene/glycidyl methacrylate).

In one preferred embodiment the polyamide mixture of the invention here comprises the following components:
1. from 60 to 96.5 parts by weight of polyamide content as entirety of components I and II,
2. from 3 to 39.5 parts by weight of an impact-resistance component comprising anhydride groups, where the impact-resistance component is selected from ethylene/α-olefin copolymers and styrene-ethylene/butylene block copolymers,
3. from 0.5 to 20 parts by weight of a copolymer which comprise units of the following monomers:
a) from 20 to 94.5% by weight of one or more α-olefins having from 2 to 12 C atoms,
b) from 5 to 79.5% by weight of one or more acrylic compounds selected from
acrylic acid and methacrylic acid and salts thereof,
esters of acrylic acid and methacrylic acid with a $C_1$-$C_{12}$-alcohol, where these can optionally bear a free hydroxy or epoxy function,
acrylonitrile and methacrylonitrile,
acrylamides and methacrylamides,
c) from 0.5 to 50% by weight of an olefinically unsaturated epoxide, carboxylic anhydride, carboximide, oxazoline or oxazinone,
where the sum of the parts by weight of components according to 1., 2. and 3. is 100.

In another preferred embodiment the polyamide mixture here comprises:
1. from 65 to 90 parts by weight, and particularly preferably from 70 to 85 parts by weight, of polyamide content as sum of components I and II,
2. from 5 to 30 parts by weight, particularly preferably from 6 to 25 parts by weight and with particular preference from 7 to 20 parts by weight, of the impact-resistance component,
3. from 0.6 to 15 parts by weight and particularly preferably from 0.7 to 10 parts by weight of the copolymer which preferably comprises units of the following monomers:
a) from 30 to 80% by weight of α-olefin(s),
b) from 7 to 70% by weight and particularly preferably from 10 to 60% by weight, of the acrylic compound(s),
c) from 1 to 40% by weight and particularly preferably from 5 to 30% by weight of the olefinically unsaturated epoxide, carboxylic anhydride, carboximide, oxazoline or oxazinone.

It is moreover also possible to use, as impact-resistance component, nitrile rubber (NBR) or hydrogenated nitrile rubber (HNBR), where these optionally comprise functional groups. US 2003/0220449A1 describes corresponding moulding compositions.

Other thermoplastics which can be present in the polyamide mixture are in the first instance polyolefins. In one embodiment they can, as described at an earlier stage above for the impact modifiers, comprise anhydride groups and then optionally be present together with an unfunctionalized impact modifier. In another embodiment they are unfunctionalized and are present in the polyamide mixture in combination with a functionalized impact modifier or a functionalized polyolefin. The term "functionalized" means that the polymers according to the background art have groups such as anhydride groups, carboxy groups, epoxy groups or oxazoline groups that can react with the terminal polyamide groups. Preference is given here to the following compositions:

1. from 50 to 95 parts by weight of polyamide content as sum of components I and II,
2. from 1 to 49 parts by weight of functionalized or unfunctionalized polyolefin and
3. from 1 to 49 parts by weight of functionalized or unfunctionalized impact modifier, where the sum of the parts by weight of components according to 1., 2. and 3. is 100.

The polyolefin is by way of example polyethylene or polypropylene. In principle it is possible to use any commercially available type. It is therefore possible by way of example to use: high-, medium- or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers and the like. The polyolefin can be produced by any known process, for example by a Ziegler-Natta process, by the Phillips process, by use of metallocenes or by a free-radical route.

In one possible embodiment the polyamide mixture comprises from 1 to 25% by weight of plasticizer, particularly preferably from 2 to 20% by weight and with particular preference from 3 to 15% by weight.

Plasticizers and their use in polyamides are known. A general overview of plasticizers suitable for polyamides can be found in Gächter/Müller, Kunststoffadditive [Plastics additives], C. Hanser Verlag, 2nd Edition, pp. 296.

Conventional compounds suitable as plasticizers are by way of example esters of p-hydroxybenzoic acid having 2 to 20 C atoms in the alcohol component or amides of arylsulphonic acids having from 2 to 12 C atoms in the amine component, preferably amides of benzenesulphonic acid. Plasticizers that can be used are inter alia ethyl p-hydroxybenzoate, octyl p-hydroxybenzoate, isohexadecyl p-hydroxybenzoate, N-n-octyltoluenesulphonamide, N-n-butylbenzenesulphonamide and N-2-ethylhexylbenzenesulphonamide.

The polyamide mixture can moreover also comprise conventional quantities of additional substances required in order to establish certain properties. Examples here are pigments and fillers such as carbon black, titanium dioxide, zinc sulphide, reinforcing fibres, e.g. glass fibres, processing aids such as waxes, zinc stearate or calcium stearate, antioxidants, UV stabilizers, and also additions which provide antielectrostatic properties to the product, for example carbon fibres, graphite fibrils, stainless-steel fibres and conductive carbon black.

The polyamide mixture of the invention can take the form of dry mixture, for example pellet mixture or powder mixture. In one embodiment here it is a mixture of pellets based on component I and, respectively, component II; these pellets can moreover comprise the other constituents. However, the polyamide mixture can also take the form of moulding compositions, where the individual constituents have been mixed together in the melt, extruded as strand and pelletized. It is also possible to use a dry mixture for the production of mouldings; the processing here must take place under conditions of shear.

Concomitant use of a compound having at least two carbonate units achieves particularly efficient increase of molecular weight of the polyamide. It is therefore preferable that for the production of large-dimension mouldings the polyamide mixture comprises a quantity of from 0.005 to 10% by weight, calculated as a ratio to the polyamide content used, of a compound having at least two carbonate units. It is preferable that this ratio is in the range from 0.01 to 5.0% by weight, particularly in the range from 0.05 to 3% by weight. The term "carbonate" here means esters of carbonic acid in particular with phenols or with alcohols. A polyamide mixture of this type is likewise a preferred embodiment of the invention.

The compound having at least two carbonate units can have low molecular weight or be oligomeric or polymeric. It can be composed entirely of carbonate units or it can also comprise other units. These are preferably oligo- or polyamide units, oligo- or polyester units, oligo- or polyether units, oligo- or polyetheresteramide units or oligo- or polyetheramide units. Compounds of this type can be produced by known oligo- or polymerization processes or by polymer-analogous reactions.

In one preferred embodiment the compound having at least two carbonate units is a polycarbonate, for example based on bisphenol A, or is a block copolymer which comprises this type of polycarbonate block.

If the compound used as additive, having at least two carbonate units, is added in the form of a masterbatch, greater precision of metering of the additive is possible, since quantities used are larger. It has moreover been found that the use of a masterbatch achieves improved extrudate quality. The masterbatch preferably comprises, as matrix material, a polyamide in the narrower sense, or a polyetheramide.

It is preferable that the concentration of the compound having at least two carbonate units in the masterbatch is from 0.15 to 50% by weight, particularly from 0.2 to 25% by weight and in particular from 0.3 to 15% by weight. This type of masterbatch is produced in the conventional manner known to the person skilled in the art.

Suitable compounds having at least two carbonate units, and also suitable masterbatches, are described in detail U.S. Pat. No. 7,005,481, which is expressly incorporated herein by way of reference.

An additive intended for molecular-weight adjustment in polyamides and based on this principle is marketed as Brüggolen M1251 by Brüggemann KG. Primary applications are within the field of viscosity adjustment for recyclate made of PA6 or PA66 reused in moulding compositions for extrusion. The additive Brüggolen M1251 is a masterbatch of a low-viscosity polycarbonate, for example Lexan 141, in an acid-terminated PA6. The increase of molecular weight results from a reaction between the polycarbonate and the terminal amino groups present in the material requiring condensation to increase molecular weight.

The effectiveness of the method is shown in U.S. Pat. No. 7,005,481 for the example of condensation to increase the molecular weight of PA6 and PA66, where the corresponding polycondensates are sometimes used in pure form, but also sometimes comprise added substances.

The invention is applicable to polyamides which comprise at least 5 ppm of phosphorus in the form of an acidic compound resulting from a production process. In this case, from 0.001 to 10% by weight, based on the polyamide, of a salt of a weak acid is added to the polyamide moulding composition prior to compounding or during compounding. Suitable salts are disclosed in US 2005/038201 A1, which is expressly incorporated herein by way of reference.

However, the invention is equally applicable to polyamides which comprise less than 5 ppm of phosphorus, or no phosphorus at all, in the form of an acidic compound resulting from a production process. Although an appropriate salt of a weak acid can be added in this case, this is not essential.

It is preferable that the compound having at least two carbonate units, per se or in the form of masterbatch, is first added after compounding, but at the latest during processing. It is preferable that during processing the polyamide mixture requiring condensation to increase molecular weight is mixed in the form of pellets with the pellets of the compound having at least two carbonate units or with the corresponding masterbatch. However, it is also possible that a pellet mixture of the already-compounded polyamide moulding composition with the compound having at least two carbonate units or, respectively, the masterbatch is produced, and then is transported or stored, and then is processed. It is, of course, also possible to use powder mixtures correspondingly. According to this preferred embodiment it is of decisive importance that the mixture is first melted during processing. Thorough mixing of the melt during processing is advisable. However, in an equally successful method using an ancillary extruder, the masterbatch can also be metered in the form of melt stream into the melt of the polyamide moulding composition requiring processing, and can then be incorporated by thorough mixing.

The process for the production of mouldings of this type is described in generalized form in US 2006/182916 and US 2006/183869.

Since the carbonate units react with the amino end groups of the polyamide and in this way act as chain extenders, it is advantageous in this case when the polyamide of component I, in this embodiment, has an excess of amino end groups. In this case, the polyamide of component I contains preferably 10 to 40 meq/kg, particularly preferably 14 to 35 meq/kg and especially preferably 28 to 32 meq/kg of carboxy end groups.

The melt mixture obtained by reaction of the polyamide mixture with the compound having at least two carbonate units is discharged and hardened. This can be achieved by way of example in the following ways:

The melt is extruded in the form of profile, for example in the form of pipe.

The melt is shaped to give a flexible tube which is applied for coating purposes to a pipe.

The melt is extruded in the form of film or sheet; these can then optionally be monoaxially or biaxially stretched and/or wound around a former. The film or sheet can also be thermoformed before further processing.

The melt is extruded to give parisons which are then moulded in a blow-moulding process.

The melt is processed in an injection-moulding process to give a moulding.

In one embodiment the mouldings produced according to the invention are hollow bodies, in particular with large diameters, for example liners, gas pipelines, layers of off-shore lines, submarine lines or supply lines, refinery lines, hydraulic lines, or chemicals lines, or are cable ducts, petrol station supply lines, vent lines, air intake pipes, tank filler necks, coolant lines, storage containers and fuel tanks. Mouldings of this type can be produced by way of example by extrusion, coextrusion or blow moulding, inclusive of suction blow moulding, 3D blow moulding, and parison-insertion processes and parison-manipulation processes. These processes are background art.

The wall of the mouldings and in particular of the hollow bodies or hollow profiles here can either be a single layer composed entirely of the moulding composition of the invention or can comprise more than one layer, where the moulding composition of the invention can form the external layer, the internal layer and/or the middle layer. The wall can be composed of a plurality of layers; the number of layers depends on the application. The other layer(s) is/are composed of moulding compositions based on other polymers, for example of polyethylene, polypropylene, or fluoropolymers, or composed of metal, for example steel.

By way of example, the flexible lines used for off-shore lines are composed of more than one layer; they are generally composed of a steel structure which comprises at least one polymer layer and generally comprises at least two polymer layers. "Unbonded flexible pipes" of this type are described by way of example in WO 01/61232, U.S. Pat. No. 6,123,114 and U.S. Pat. No. 6,085,799; they are moreover described in more detail in API Recommended Practice 17B, "Recommended Practice for Flexible Pipe", 5th Edition, May 2014, and also in API Specification 17J, "Specification for Unbonded Flexible Pipe", 4th Edition, May 2014. The term "unbonded" in this context means that at least two of the layers, inclusive of reinforcing layers and plastics layers, do not have any mutual structural bonding. In practice, the pipe comprises at least two reinforcing layers which, over the entire length of the pipe, have no mutual bonding either directly or indirectly, i.e. by way of other layers. This renders the pipe flexible to an extent that allows it to be rolled up for transport purposes. The polymer layers here assume firstly the function of sealing of the pipe so that the transported fluid cannot escape, and secondly, if the layer is external, the function of protection of the steel layers from the surrounding seawater. In one embodiment the polymer layer that provides sealing in relation to the transported fluid has been extruded on an internal carcass. This polymer layer, also often termed barrier layer, can in turn, as described above, be composed of more than one polymer layer.

In another embodiment a rigid metal pipe comprises an inliner which is a tubular moulding of the invention. The introduction of this type of inliner into a metal pipe is described in more detail by way of example in US2010/0300573, and also in the literature listed therein.

Use of polyetheramide in the masterbatch or in the polyamide mixture used can advantageously increase the flexibility of the moulding composition to an extent that allows optional omission of external plasticizers for further plasticization of barrier layers or inliners of this type. This has the advantage that the properties of the material remain constant even after contact with highly extractive media, e.g. supercritical carbon dioxide.

It is moreover possible to coat a rigid metal pipe with the moulding composition of the invention, for example by extrusion coating. Production and use of coated pipes of this type are known from US 2010/0300572, US 2012/0000541 and US 2010/0257932.

Having generally described this invention, a further understanding can be obtained by reference to certain specific examples which are provided herein for purposes of illustration only, and are not intended to be limiting unless otherwise specified.

EXAMPLES

The invention is elucidated in detail hereinafter by examples.

Preparation Example 1

Polyamine-Polyamide Graft Copolymer (Referred to Hereinafter as "Graft Copolymer")

95.5 kg of laurolactam are melted in a heated tank at 180° C. to 210° C. and transferred into a pressure-resistant polycondensation vessel; subsequently, 5.0 kg of water and 0.0113 kg of a 50 percent aqueous solution of hypophosphorous acid are added. The lactam cleavage was conducted at 280° C. under the autogenous pressure established; this was followed by decompression to a residual steam pressure of 5 bar within 3 hours and metered addition of 9.0 kg of a 50 percent aqueous solution of a polyethyleneimine (LUPASOL® G 100 from BASF SE) and 0.18 kg of dodecanedioic acid. The two components were incorporated under the autogenous pressure established; this was followed by decompression to atmospheric pressure and then by passage of nitrogen over the melt at 280° C. for 2 hours. The clear melt was discharged as an extrudate by means of a melt pump, cooled in a water bath and then pelletized.

$\eta_{rel}$: 1.41

Amino group concentration: 792 meq/kg

Carboxyl end group concentration: 0 meq/kg

Preparation Example 2

Polyamide Moulding Composition Comprising Branched PA12

According to a background art method, a PA12 formed with tricarboxylic acid and dicarboxylic acid chain regulators from 1000.0 kg of laurolactam (99.79 mol %), 43.0 kg of water, 0.114 kg of a 50 percent aqueous solution of hypophosphorous acid, 1.231 kg of dodecanedioic acid (0.11 mol %) and 1.066 kg of trimesic acid (0.10 mol %) was prepared. The analysis was:

$\eta_{rel}$: 2.1

Amino end group concentration: 14 meq/kg

Carboxyl end group concentration: 39 meq/kg

The polyamide obtained was mixed in the melt in a known manner with 145.0 kg of BBSA (N-n-butylbenzenesulfonamide; plasticizer), 12.0 kg stabilizers and 0.230 kg of processing auxiliaries, in order to obtain a moulding composition as would typically be used for the production of inliners for metallic pipes. The melt was discharged as an extrudate and pelletized.

Preparation Example 3

Inventive Polymer Mixture 90 kg of pellets from Preparation Example 2 were mixed mechanically with 10 kg of graft copolymer pellets from Preparation Example 1; the resultant dry mixture or pellet mixture was used directly in the subsequent further processing.

Preparation Example 4

Reactive Pellet Mixture

The following components were mixed mechanically with one another as pellets:

75 kg of component A, produced by melt-mixing 83.223% by weight of an unbranched PA12 prepared with a diamine chain regulator and having $\eta_{rel}$ 2.15, amino end group concentration 40 meq/kg and carboxy end group concentration 10 meq/kg, 4.744% by weight of Exxelor® VA 1803 (ethylene-propylene rubber containing carboxylic anhydride groups as impact modifier), 10.403% by weight of BBSA, 1.524% by weight of stabilizers and 0.124% by weight of calcium stearate.

25 kg of component B, produced by melt-mixing 82.196% by weight of an unbranched PA12 prepared with a dicarboxylic acid chain regulator and having $\eta_{rel}$ 2.15, amino end group concentration 10 meq/kg and carboxy end group concentration 40 meq/kg, 4.685% by weight of Exxelor® VA 1803, 1.726% by weight of Brüggolen® M1251 (block copolymer based on polycarbonate and PA6), 10.275% by weight of BBSA, 0.994% by weight of stabilizers and 0.123% by weight of calcium stearate.

The resultant pellet mixture was used directly in the subsequent further processing; in this case, the reaction with the Brüggolen® M1251 distinctly increased the melt viscosity and solution viscosity.

Preparation Example 5

Reactive Pellet Mixture with Graft Copolymer

The following components were mixed mechanically with one another as pellets:

70 kg of component A as in Preparation Example 4, with the sole difference that, of the 83.223% by weight of the PA12 prepared with a diamine chain regulator, 13.300% by weight were replaced by the graft copolymer from Preparation Example 1.

30 kg of component B as in Preparation Example 4.

The resultant pellet mixture was used directly in the subsequent further processing; in this case, the reaction with the Brüggolen® M1251 distinctly increased the melt viscosity and solution viscosity.

Production of the Test Specimens:

The products from Preparation Examples 2 to 5 were each extruded to pipes having an external diameter of 12 mm and a wall thickness of 1 mm. The extruded pipes were stored in glass bottles with screwtop lids at 120° C. in demineralized water. For this purpose, a Laboklav steam sterilizer with discrete sample bottles was used.

The following analyses were conducted on the samples:

The corrected inherent viscosity CIV of extracted specimens was determined in accordance with API Technical Report 17 TR2, First Edition, June 2003, Appendix D. The procedure described therein for PA11 can be generalized for all polyamides. It corresponds to ISO 307:1994, but with 20° C. in the bath rather than 25° C.

To measure elongation at break in accordance with ASTM D638, the type V specimen was cut out of the tubes.

Figure 2:
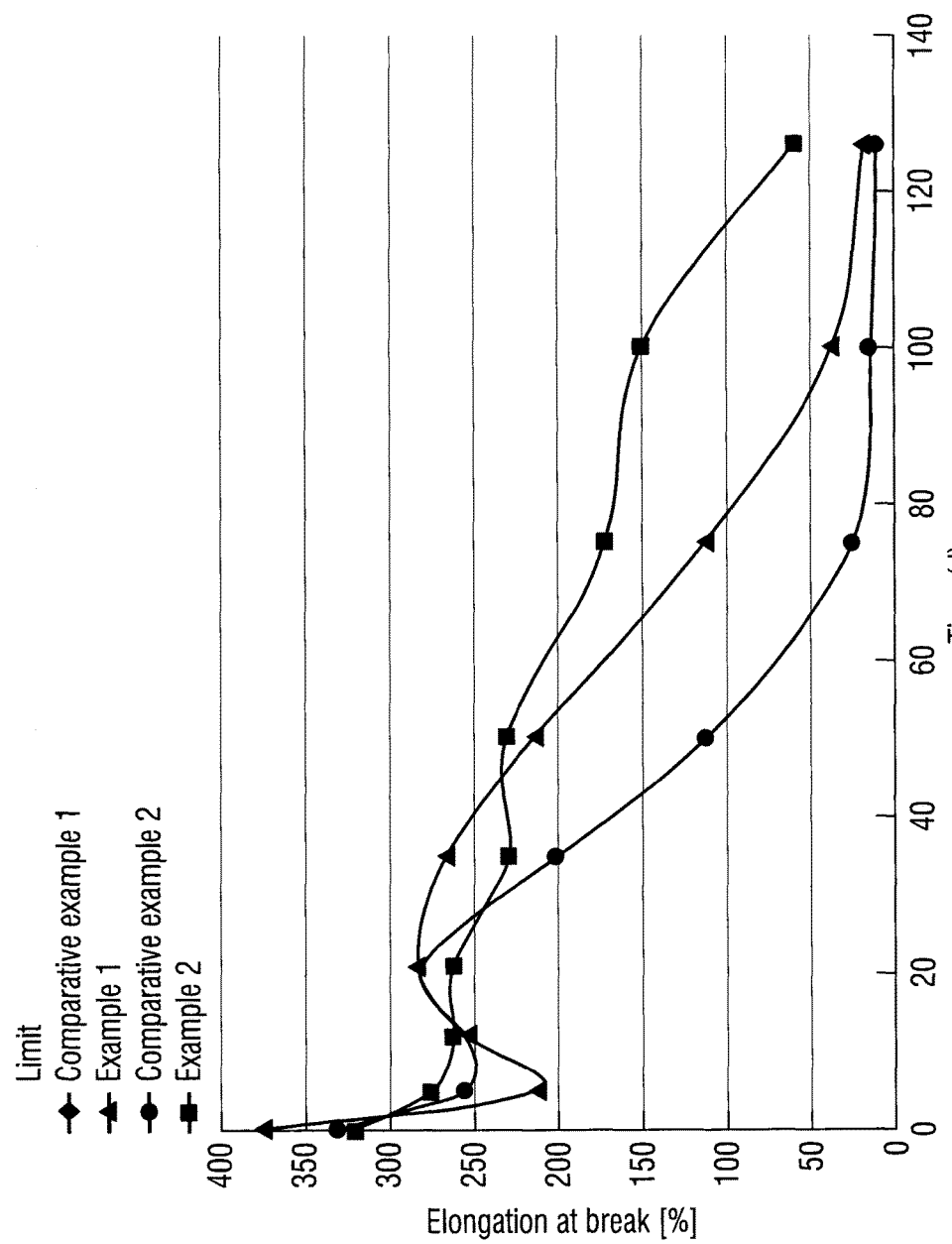
FIG. 2 shows the time dependence of the elongation at break of specimens of type V in accordance with ASTM D638.

The results are shown in Table 1 and FIGS. 1 and 2. In Comparative Example 1, no measurement of elongation at break was made because of the low hydrolysis stability.

It is apparent from FIG. 1 that the best hydrolysis stabilization is obtained when the polyamide of component I is branched and contains an excess of carboxyl groups. If, according to Example 2, an unbranched polyamide with an excess of amino groups is used as component I (here a mixture of a polyamide prepared with a diamine chain regulator and one prepared with a dicarboxylic acid chain regulator, resulting in an overall excess of amino groups), the limit of 1.2 dl/g in the CIV value defined by the application (inliner for a metal pipe in crude oil production) is reached at a comparatively early stage in the case of water storage, but more than twice the service life is still achieved compared to the background art as illustrated by Comparative Example 2. The elongation at break (see FIG. 2) as a further application-based criterion, on the other hand, reaches the limit of 50% defined by the application only at a very late stage here. This means that the moulding composition, in spite of an advanced hydrolysis, still has sufficient mechanical reserves.

Figure 3:
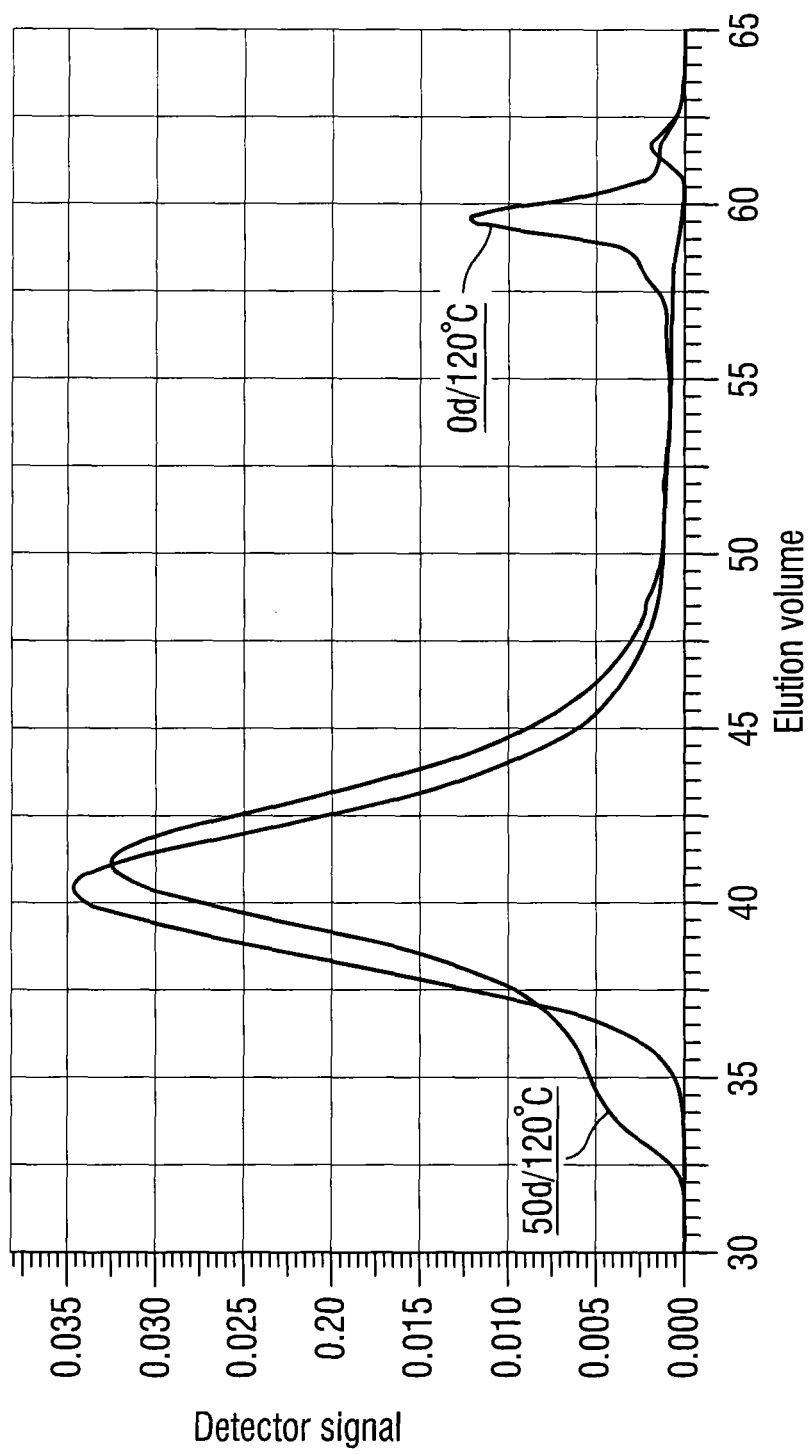
FIG. 3 shows the molar mass distribution, determined via gel permeation chromatography (GPC) in hexafluoroisopropanol, of the zero sample of Example 1, and of a sample of Example 1 stored in water at 120° C. for 50 days.

The hydrolysis stabilization found is achieved only to a marginal degree by virtue of the amino groups introduced with the graft copolymer. During the water storage, there is instead a reaction between component I and component II. FIG. 3 shows the molar mass distribution, determined via gel permeation chromatography (GPC) in hexafluoroisopropanol, of the zero sample of Example 1, and of a sample of Example 1 stored in water at 120° C. for 50 days. In the case of the zero sample (red curve), the graft copolymer can clearly be seen as a low molecular weight component at high elution volume. After water storage for 50 days, this component has essentially disappeared; on the other hand, a shoulder has formed in the high molecular weight region. This explains the finding that the CIV value is at an unchanged level after 50 days. The mechanism of action in the hydrolysis stabilization is thus complex and involves a reaction between components I and II. This reaction is manifested in the rise in solution viscosity found in the first few days of water storage.

European patent application 14182218.9 filed Aug. 26, 2014, is incorporated herein by reference.

Numerous modifications and variations on the present invention are possible in light of the above teachings. It is therefore to be understood that within the scope of the appended claims, the invention may be practiced otherwise than as specifically described herein.

TABLE 1

Results of the hydrolysis experiments

| Example | Test | 0 d | 4 d | 5 d | 12 d | 21 d | 25 d | 35 d | 42 d | 50 d | 75 d | 100 d | 126 d |
|---|---|---|---|---|---|---|---|---|---|---|---|---|---|
| CE 1 from Preparative Example 2 | CIV [dl/g] | 1.651 | 1.514 | — | — | — | 1.201 | — | 1.044 | — | — | — | — |
| I1 from Preparative Example 3 | CIV [dl/g] | 1.619 | — | 1.656 | 1.686 | 1.648 | — | 1.609 | — | 1.619 | 1.550 | 1.552 | 1.514 |
| | Elongation at break [%] | 375 | — | 212 | 254 | 284 | — | 267 | — | 214 | 112 | 37 | 18 |
| CE 1 from Preparative Example 4 | CIV [dl/g] | 2.048 | | 1.791 | 1.431 | 1.163 | | 0.995 | | 0.979 | 0.951 | 0.969 | 0.959 |
| | Elongation at break [%] | 332 | | 256 | 256 | 282 | | 201 | | 112 | 25 | 14 | 10 |
| I2 from Preparative Example 5 | CIV [dl/g] | 1.649 | | 1.580 | 1.455 | 1.342 | | 1.223 | | 1.209 | 1.138 | 1.150 | 1.129 |
| | Elongation at break [%] | 320 | | 276 | 263 | 263 | | 230 | | 231 | 172 | 151 | 60 |

(I = inventive example; CE = comparative example)

The invention claimed is:

1. A metallic pipe, comprising:
a layer of a polyamide moulding composition comprising at least 50% by weight of polyamide comprising the following components:
I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
II) from 2 to 40 parts by weight of a polyamine-polyamide graft copolymer which is produced from the following monomers:
 a) from 0.5 to 25% by weight, based on the entire monomer mixture, of a polyamine having at least 4 nitrogen atoms, and
 b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof,
with the proviso that the amino group concentration of the graft copolymer is in the range from 100 to 2500 meq/kg,
wherein the sum of the parts by weight of I) and II) is 100.

2. The metallic pipe according to claim 1, which is a flexible or rigid pipe which comprises the layer of the polyamide moulding composition as inliner or as a layer of a multilayered inliner.

3. The metallic pipe according to claim 1, which is a rigid pipe which comprises the layer of the polyamide moulding composition as external coating.

4. The metallic pipe according to claim 1, wherein the polyamide moulding composition has been produced by adding from 0.005 to 10% by weight of a compound having at least two carbonate units, calculated as a ratio to the polyamide used.

5. A method for conveying a hydrolyzing medium, comprising:
conveying said hydrolyzing medium through a metallic pipe according to claim 1.

6. A polyamide mixture, comprising:
at least 50% by weight of polyamide comprising the following components:
I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
II) from 2 to 40 parts by weight of a polyamine-polyamide graft copolymer which is produced from the following monomers:
 a) from 0.5 to 25% by weight, based on the entire monomer mixture, of a polyamine having at least 4 nitrogen atoms, and
 b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof,
with the proviso that the amino group concentration of the graft copolymer is in the range from 100 to 2500 meq/kg, wherein the sum of the parts by weight of I) and II) is 100 and wherein the polyamide mixture further comprises from 0.005 to 10% by weight, calculated as a ratio to the polyamide used, of a compound having at least two carbonate units.

7. A polyamide mixture, comprising:
at least 50% by weight of polyamide comprising the following components:
I) from 60 to 98 parts by weight of a polyamide which comprises from 10 to 70 meq/kg of a terminal carboxy group and has a relative solution viscosity $\eta_{rel}$ of at least 1.90, determined in accordance with ISO 307 using a 0.5% by weight solution in m-cresol at 25° C., and
II) from 2 to 40 parts by weight of a polyamine-polyamide graft copolymer which is produced from the following monomers:
   a) from 0.5 to 25% by weight, based on the entire monomer mixture, of a polyamine having at least 4 nitrogen atoms, and
   b) from 75 to 99.5% by weight, based on the entire monomer mixture, of a polyamide-forming monomer selected from the group consisting of lactams, ω-aminocarboxylic acids, equimolar combinations of diamine and dicarboxylic acid, and mixtures thereof,
with the proviso that the amino group concentration of the graft copolymer is in the range from 100 to 2500 meq/kg,
wherein the sum of the parts by weight of I) and II) is 100 and wherein the polyamide of component I is produced using from 0.01 to 0.6 mol %, based on the entirety of the polymers used, of an at least trifunctional chain regulator having a functional group which is a carboxyl group and/or an amino group.

8. The polyamide mixture according to claim 6, which is a dry mixture or a moulding composition.

9. The polyamide mixture according to claim 7 which is a dry mixture or a moulding composition.

10. The polyamide mixture according to claim 7, wherein the polyamide of component I is produced with tricarboxylic acid and optionally dicarboxylic acid as chain regulator.

11. The polyamide mixture according to claim 7, wherein the polyamide of component I is produced with a mixture of triamine and dicarboxylic acid as chain regulator.

12. The polyamide mixture according to claim 7, wherein in the polyamide of component I the concentration of the terminal carboxy groups is higher than the concentration of the terminal amino groups.

13. The polyamide mixture according to claim 7, comprising from 0.005 to 10% by weight, calculated as a ratio to the polyamide used, of a compound having at least two carbonate units.

14. A moulding, comprising:
at least a region comprising the polyamide mixture according to claim 6.

15. The moulding according to claim 14, wherein the entire moulding comprises said polyamide mixture.

16. The moulding according to claim 14, comprising more than one layer, wherein at least one layer comprises said polyamide mixture.

17. A moulding, comprising:
at least a region comprising the polyamide mixture according to claim 7.

18. The moulding according to claim 17, wherein the entire moulding comprises said polyamide mixture.

19. The moulding according to claim 17, comprising more than one layer, wherein at least one layer comprises said polyamide mixture.

* * * * *